US008599210B2

(12) United States Patent
Constable et al.

(10) Patent No.: US 8,599,210 B2
(45) Date of Patent: Dec. 3, 2013

(54) SURFACE CACHING (75) Inventors: Benjamin C. Constable, Redmond, WA (US); Brian E. Manthos, Sammamish, WA (US); Li-Hsin Huang, Redmond, WA (US); Rafael V. Cintron, Kirkland, WA (US); Samuel R. Fortiner, Woodinville, WA (US); Jia Zhu, Chicago, IL (US)

(73) Assignee: Microsoft Corporation, Redmond, WA (US)

( * ) Notice: Subject to any disclaimer, the term of this patent is extended or adjusted under 35 U.S.C. 154(b) by 26 days.

(21) Appl. No.: 13/156,292

(22) Filed: Jun. 8, 2011

(65) Prior Publication Data
US 2012/0297160 A1 Nov. 22, 2012

(30) Foreign Application Priority Data

May 17, 2011 (CA) ...................................... 2739677

(51) Int. Cl.
*G09G 5/00* (2006.01)
(52) U.S. Cl.
USPC .......................................... 345/582; 345/557
(58) Field of Classification Search
USPC ........................................... 345/557, 582–588
See application file for complete search history.

(56) References Cited

U.S. PATENT DOCUMENTS

| 5,588,138 | A  | * | 12/1996 | Bai et al. ........................ 711/173 |
| 6,182,133 | B1 |   | 1/2001  | Horvitz |
| 7,170,526 | B1 | * | 1/2007  | Johnson ......................... 345/582 |
| 7,196,712 | B2 |   | 3/2007  | Rajarajan et al. |
| 7,561,156 | B2 |   | 7/2009  | Levanon et al. |
| 7,565,490 | B1 | * | 7/2009  | Donham et al. ............... 711/122 |
| 7,719,540 | B2 |   | 5/2010  | Piazza et al. |
| 2005/0122337 | A1 | * | 6/2005 | Chen ............................... 345/545 |
| 2006/0195779 | A1 |   | 8/2006 | McElroy et al. |
| 2007/0263007 | A1 | * | 11/2007 | Robotham et al. ............ 345/581 |
| 2008/0094407 | A1 | * | 4/2008 | Xu et al. ........................ 345/552 |
| 2009/0228782 | A1 |   | 9/2009 | Fraser |
| 2010/0194753 | A1 |   | 8/2010 | Robotham et al. |

OTHER PUBLICATIONS

Miller et al., On-the-Fly Texture Computation for Real-Time Surface Shading, Computer Graphics and Applications, IEEE, vol. 18, Issue 2, Mar./Apr. 1998, pp. 44-58.*
"Foreign Notice of Allowance", Canadian Application No. 2739677, (Mar. 1, 2012), 2 pages.
Abrash, Michael, "Surface Caching Revisited, Quake's Triangle Models, and More", Retrieved at <<http://www.bluesnews.com/abrash/chap69.shtml>>, Retrieved Date: Mar. 1, 2011, pp. 8.
"Foreign Office Action", Canadian Application 2,739,677, (Oct. 27, 2011), 3 pages.

\* cited by examiner

*Primary Examiner* — Xiao M. Wu
*Assistant Examiner* — Charles Tseng
(74) *Attorney, Agent, or Firm* — Wolfe-SBMC (57) ABSTRACT

Techniques for surface caching are described in which a cache for surfaces is provided to enable existing surfaces to be reused. Surfaces in the cache can be assigned to one of multiple surface lists used to service requests for surfaces. The multiple lists can include at least a main list and an auxiliary list configured to group existing surfaces according to corresponding surface constraints. When a surface is requested, the multiple lists can be searched to find an existing surface based on constraints including, for example, the type of surface and size requirements for the requested surface. If an existing surface is discovered, the existing surface can be returned to service the request. If a suitable surface is not found in the multiple lists, a new surface is created for the request and the new surface can be added to a corresponding one of the multiple surface lists.

17 Claims, 5 Drawing Sheets

SURFACE CACHING

PRIORITY CLAIM

This application claims priority under 35 U.S.C. §119 to Canadian Patent Application Serial No. 2739677 filed in Canada on May 17, 2011 and titled "Surface Caching," the disclosure of which is incorporated by reference in its entirety herein.

BACKGROUND

Intermediate rendering surfaces are employed to render complex web pages (e.g., HTML pages) that use visual effects/properties such as blurring and opacity. The quantity and sizes of surfaces and corresponding amount of memory utilized to create a web page can be quite large. In a traditional approach, surfaces were created on demand and destroyed as needed after being used to free up memory. Although memory is saved with this approach, a considerable amount of time and processing power is consumed by frequently creating and destroying the surfaces that are stored on a GPU. In another traditional approach, a simple fixed size cache was employed for creating surfaces. In this approach, the cache was cleared by destroying surfaces on a rolling basis using basic algorithms like first in first out, least recently used, or closest match. The fixed size cache approach, however, limits flexibility to change the cache size as needed and fails to reuse surfaces to make efficient use of memory space and processing power.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for surface caching are described in which a cache for surfaces is provided to enable existing surfaces to be reused. Surfaces in the cache can be assigned to one of multiple surface lists used to service requests for surfaces. The multiple lists can include at least a main list and an auxiliary list configured to group existing surfaces according to corresponding surface constraints. When a surface is requested, the multiple lists can be searched to find an existing surface based on constraints including, for example, the type of surface and size requirements for the requested surface. If an existing surface satisfying the constraints is discovered, the existing surface can be returned to service the request. If a suitable surface is not found in any of the multiple lists, a new surface is created for the request and the new surface can be added to a corresponding one of the multiple surface lists.

BRIEF DESCRIPTION OF THE DRAWINGS

The same numbers are used throughout the drawings to reference like features.

DETAILED DESCRIPTION

Overview

Techniques for surface caching are described in which a cache for surfaces is provided to enable existing surfaces to be reused. Surfaces in the cache can be assigned to one of multiple surface lists used to service requests for surfaces. The multiple lists can include at least a main list and an auxiliary list configured to group existing surfaces according to corresponding constraints. When a surface is requested, the multiple lists can be searched to find an existing surface based on constraints including, for example, the type of surface and size requirements for the requested surface. If an existing surface satisfying the constraints is discovered, the existing surface can be returned to service the request. If a suitable surface is not found in any of the multiple lists, a new surface is created for the request and the new surface can be added to a corresponding one of the multiple surface lists.

In the discussion that follows, a section titled "Operating Environment" is provided and describes one environment in which one or more embodiments can be employed. Following this, a section titled "Surface Caching Techniques" describes example techniques and implementations details in accordance with one or more embodiments. Last, a section titled "Example System" describes example computing systems and devices that can be utilized to implement one or more embodiments.

Operating Environment

Figure 1:
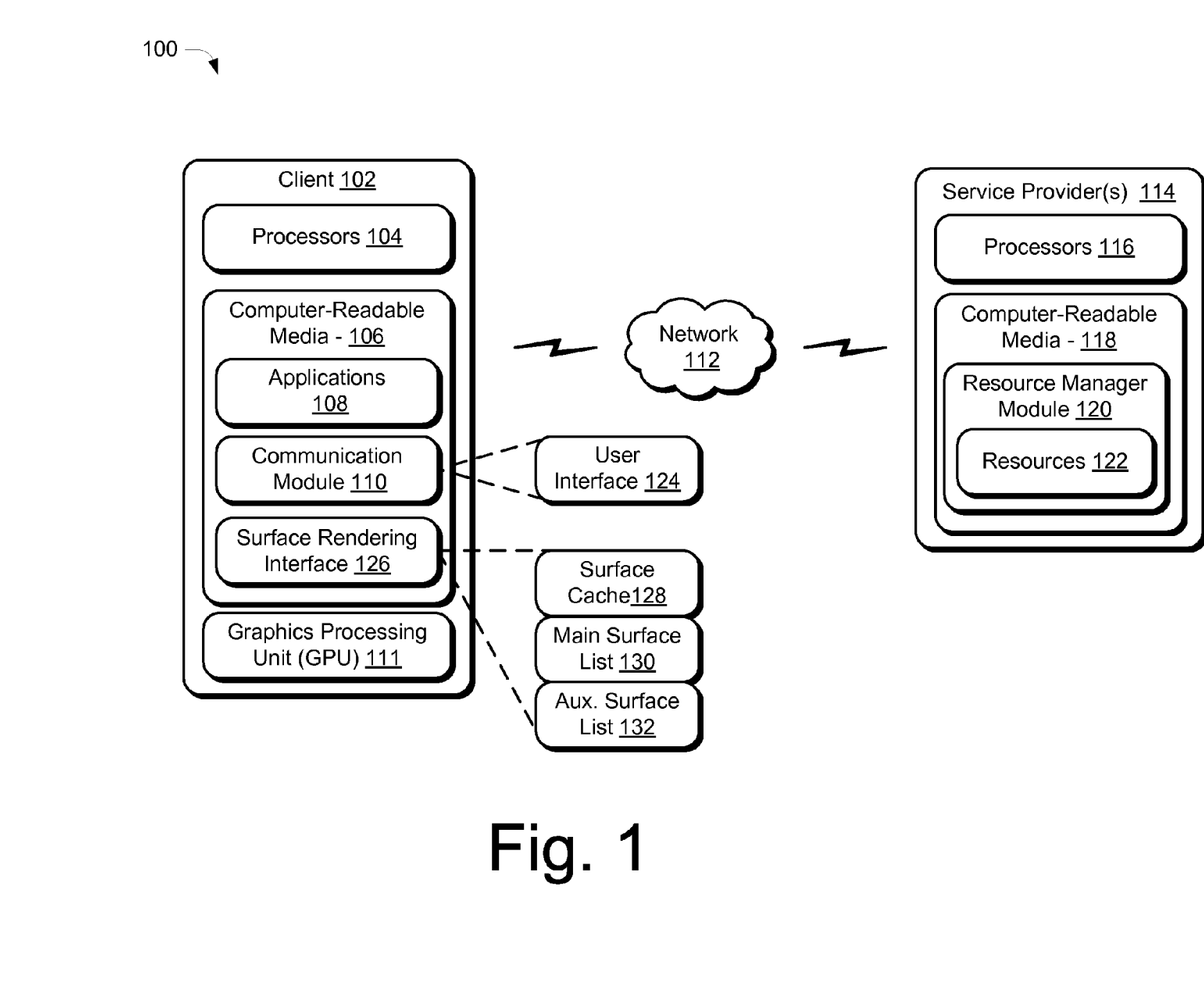
FIG. 1 illustrates an operating environment in which various principles described herein can be employed in accordance with one or more embodiments.

FIG. 1 illustrates an operating environment in accordance with one or more embodiments, generally at 100. The environment 100 includes a client 102 having one or more processors 104, one or more computer-readable media 106, and one or more applications 108 that reside on the computer-readable media and which are executable by the processor(s). The client 102 can be embodied as any suitable computing system and/or device such as, by way of example and not limitation, a desktop computer, a portable computer, as tablet computer, a handheld computer such as a personal digital assistant (PDA), a cell phone, a set-top box, and the like. One example of a computing system that can represent various systems and/or devices including the client 102 is shown and described below in FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can also be found in the discussion of the example computing system of FIG. 5.

In addition, client 102 includes a software application in the form of a communication module 110. The communication module 110 is operable by the client 102 to communicate and interact with various other entities (e.g., other clients, providers, servers, web sites). Interactions with other entities can include sending and receiving electronic messages in various forms (e.g., e-mail, instant messages, text messages, and so forth) between the entities, obtaining resources (e.g., content and services) from the other entities, accessing and/or downloading web pages and documents from web sites, and so forth. The communication module 110 can be implemented as a standalone application, such as a web browser, and/or as a component of another application 108 that provides communication and browsing functionality to the application 108.

The client 102 can also include a graphics processing unit (GPU) 111. The GPU 111 is a hardware component of the computing device that is dedicated to graphics processing. Functionality provided by the GPU 111 includes, but is not limited to, controlling aspects of resolution, pixel shading operations, color depth, surface rendering, texture mapping, 3D rendering, and other tasks associated with rendering user interfaces and images for applications. This can include processing tasks such as polygon drawing, bitmap transfers and painting, window resizing and repositioning, line drawing, font scaling, and so forth. The GPU 111 may be capable of handling various processing tasks in hardware at greater speeds than software executed on the processor(s) 104. Thus, the dedicated graphics processing capability of the GPU 111 can accelerate graphics processing, reduce the workload of the processor(s) 104, and free up system resources for other tasks.

As further illustrated in the example environment 100, the client 102 can be communicatively coupled over a network 112, such as the Internet, with one or more service providers 114 from and to which resources (e.g., content and services) can be received and sent. The example service providers 114 of FIG. 1 are each depicted as having one or more processors 116 and one or more computer-readable media 118. A service provider 114 can be implemented by way of one or more server devices. Accordingly, various example components represented and described for a service provider 114 can be included on a single server device and/or can be divided between multiple different server devices.

The service provider 114 is depicted as including a resource manager module 120 that is operable by the service provider 114 to manage various resources 122 that may be made available over the network 112. For example, various resources 122 can be provided by way of web pages, HTML pages, application UIs, or other user interfaces 124 that are communicated over the network 112 for output by the client 102 as illustrated in FIG. 1. The resource manager module 120 can manage access to the resources 122, provision of the resources 122, configuration of user interfaces 124 or data sufficient to provide the resources 122, and so on.

A service provider 114 can provide one or more web servers and/or sites (e.g., domains), which a client 102 can navigate to in order to access the resources 122. The resources 122 can include any suitable combination of services and/or content typically made available over a network by one or more providers. Some examples of services include, but are not limited to, a search service, an e-mail service to send and receive e-mail, an instant messaging service to provide instant messages between clients 102, and a social networking service to facilitate connections and interactions between groups of users who share common interests and activities. Additional examples of services include a technical support service, shopping service, a weblog service, a productivity service, an authentication service, a news service, and an advertisement service to name a few. Content may include various combinations of text, video, ads, audio, multi-media streams, animations, images, web pages, web applications, device applications, and the like.

The client 102 also includes a surface rendering interface 126 configured to implement aspects of surface caching techniques described herein. In particular, the surface rendering interface 126 can provide and manage a surface cache 128 that enables various rendering surfaces to be reused. In at least some embodiments, the surfaces are configured to facilitate rendering of animations, graphics, page content and other content for web pages output to provide interaction with various resources 122. At least some of the content can be rendered using accelerated graphics processing capabilities of the GPU 111. It should be noted, though, that surface caching techniques described herein can also be employed for creating, managing, and using surfaces produced through a system processor (e.g., a CPU) using system memory. Surface caching techniques can further be applied to surfaces that are created using processing capabilities of multiple processors in combination, such as surfaces created using the GPU and processors 104 in combination. The surface rendering interface 126 can maintain surfaces in the cache and assign the surfaces to multiple different surface lists based upon corresponding properties of the surfaces. The surface rendering interface 126 can be implemented as a standalone application as illustrated. In addition or alternatively, the surface rendering interface 126 can be implemented as a component of a communication module 110, a browser, or other application 108 of the client 102.

By way of example, the surface rendering interface 126 is illustrated as providing a main surface list 130 and an auxiliary surface list 132 to which various reusable surfaces can be assigned. In response to requests to reuse surfaces, the surface rendering interface 126 can search multiple surface lists and return an existing surface that satisfies the request if such a surface is available. The surface rendering interface 126 can also create new surfaces and assign the surfaces to a corresponding list if appropriate. Details regarding these and other aspects of techniques for surface caching are described in relation to the figures that follow.

Having described an example operating environment, consider now example implementation details for surface caching in accordance with one or more embodiments.

Surface Caching Techniques

The following section provides a discussion of flow diagrams that describe techniques for surface caching that can be implemented in accordance with one or more embodiments. The example methods depicted can be implemented in connection with any suitable hardware, software, firmware, or combination thereof. In at least some embodiments, the methods can be implemented by way of a suitability configured computing device, such as the example client 102 of FIG. 1 that includes or otherwise makes use of a surface rendering interface 126.

Figure 2:
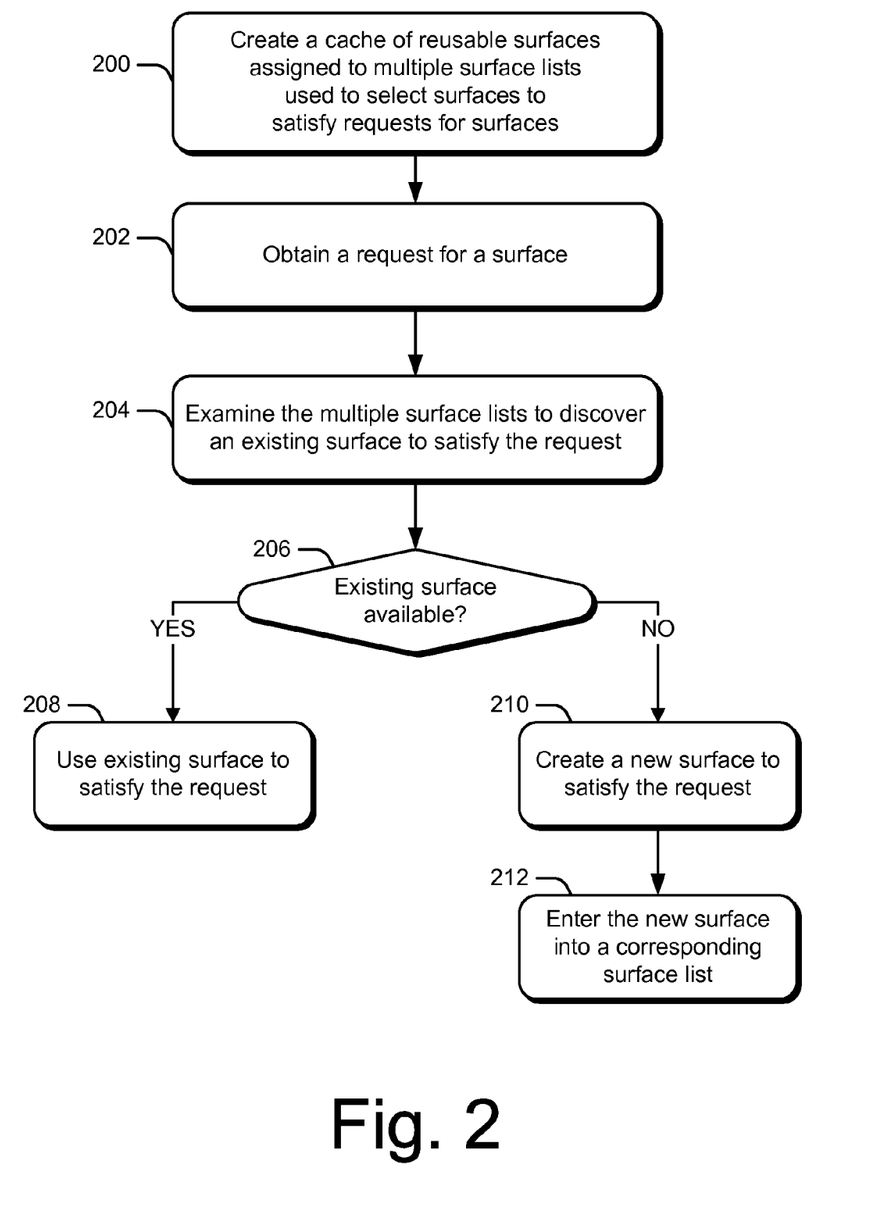
FIG. 2 is a flow diagram that describes steps of an example method in accordance with one or more embodiments.

In particular, FIG. 2 depicts an example method in which multiple surface lists can be referenced to find reusable surfaces that satisfy requests for surfaces. Step 200 creates a cache of reusable surfaces assigned to multiple surface lists used to select surfaces to satisfy requests for the surfaces. For example, the surface rendering interface 126 can implement a surface cache 128 in any suitable memory of a client 102 and using any suitable combination of one or more processors. In addition or alternatively, the surface cache 128 can be created within memory provided as a component of the GPU 111. Surfaces that are created for various purposes can be added to the cache so that the surfaces can be reused. By so doing, it is possible to reduce the number of times that surfaces are created from scratch.

Surfaces in the cache can be assigned to multiple surface lists maintained by the surface rendering interface 126. In general, the multiple lists are configured to group or otherwise organize existing surfaces according to corresponding constraints of the surfaces. Different lists can be created to include entries for surfaces having different individual constraints and/or combinations of constraints that define and/or describe properties of surfaces entered in respective lists. Such surface constraints for surfaces can include, but are not limited to, the type of surface, the size of the surface, type of content compatible with the surfaces, whether an exact size is designated, whether an oversized surface is acceptable, a limit on the oversize, a pixel format, a color arrangement, and so forth. In one embodiment, the multiple surface lists include at least a main surface list 130 and an auxiliary surface list 132 that are associated with different respective surface constraint configurations for surfaces assigned to the lists. Thus, surfaces can be entered into matching lists based on the corresponding constraints.

In one particular example, the main surface list 130 is configured to include entries for surfaces designed to handle tree-based content rendering situations that involve composited content. The auxiliary surface list 132 is used to augment the first list with entries for surfaces designed to handle non-tree based content rendering situations. This is but one illustrative example of grouping surfaces using different lists. In this particular example, the surfaces entered within the lists are based upon the type of surface and/or the type of compatible content associated with the surfaces.

Tree-based content rendering relates to hierarchical or nested content that can be defined by a plurality of interrelated nodes. For this type of content, rendering can occur by progressing down the tree node-by-node to render content for successive nodes of the tree. For example, a depth first approach can be used to process successive nodes that represent transparent frames or layers that are rendered over one another to create a graphic or effect. Typically, tree-based content rendering can retain drawing instructions and make use of the retained instructions as rendering progresses from node to node.

A variety of intermediate surfaces can be used to render tree-based content. Moreover, based on the tree nature of the content, numerous opportunities to reuse surfaces can be expected. Tree-based content rendering often involves repetitive use of the same or similar surfaces. Further, these surfaces may have relatively few constraints placed on size. For instance, rendering can occur at the deepest level and proceed with rendering at different depths. Surfaces can be used for rendering at each level. When rendering of a particular level is complete, techniques described herein enable the surface to be reused for a different (e.g., shallower) level of the tree. Thus, a surface used at a deep level may be suitable for one or more subsequent levels in the tree.

Non tree-based content rendering relates to other types of content that generally do not follow tree rules. Generally, non-tree based rendering creates/consumes drawing instructions on an as needed basis and discards the instructions right after rendering. Non tree-based situations can result in varied surfaces that have unique shapes and/or constraints. As such, opportunities to reuse surfaces can involve different kinds of heuristics and analysis than those employed for tree-based rendering. Accordingly, segregating the non tree-based surfaces into an auxiliary list can create processing benefits such as preserving tree-based caching efficiency in the main list by reducing non-tree based requests and speeding-up processing of the main list by reducing the size of the list.

Optionally, other surface constraints and/or additional surface lists can be employed to further divide and organize surfaces in the cache into any suitable groupings. For example, surfaces can be grouped based upon whether or not the surfaces have associated size constraints. Surfaces can also be grouped via the multiple lists according to different sizes of the surfaces (e.g., big, medium, small, etc.). The groupings of surfaces using multiple surface lists arranged around different respective surface constraints can enable targeted searching of the lists that can speed up the process of finding an existing surface to service a request. Moreover, the different lists can be managed independently of one another, which provides a great deal of flexibility to add, remove, and reuse surfaces in an efficient manner.

Step 202 obtains a request for a surface. For example, a request for a surface can be made in connection with output of a web page via the communication module 110 (e.g., browser). The request can be communicated to the surface rendering interface 126 in any suitable way. The request can designate constraints for the requested surface, which again can include such constraints as the size of a surface, the type of surface, whether the surface needs to exactly match the requested size, whether an oversized surface is acceptable, a limit if any on the oversize, a pixel format, and/or a color arrangement. More generally, a request can designate any suitable constraints that define the contours of the surface being requested. In response to the request, the surface rendering interface 126 can be configured to process the request and provide a suitable surface to satisfy the request. In some cases an existing surface can be found by searching the multiple surface lists. When an existing surface is not available, the surface rendering interface 126 can operate to create a new surface from scratch.

Step 204 examines the multiple surface lists to discover an existing surface to satisfy the request. This can involve searching the multiple lists in any suitable way. For example, surface rendering interface 126 can examine the cache by iteratively searching surfaces assigned to different lists successively (e.g., one at a time) to find a surface that most closely matches constraints designated by the request. In addition or alternatively, the surface rendering interface 126 can be configured to examine different lists simultaneously to discover a matching surface if one exists. Additional details regarding example techniques for searching surface lists are provided in relation to the example methods of FIGS. 3 and 4 below.

Based on the examination, step 206 determines whether an existing surface is available. This involves comparing constraints of the requested surface to available surfaces in the multiple surface lists to find a surface that satisfies the request. If a matching surface is discovered, step 208 uses the existing surface to satisfy the request. For instance, the surface rendering interface 126 can be configured to return the surface and/or information sufficient to locate and use the surface from the cache to an application 108 that requested the surface. By way of example, a matching surface (if one exists) can be returned to the communication module 110 to render a web page.

On the other hand, if a matching surface cannot be found, step 210 creates a new surface to satisfy the request. This can occur for example if a surface that matches size parameters and/or other designated constraints is not available in the surface cache 128. In this case, surface rendering interface 126 can be configured to create a new surface, such as by directing creation of the surface through the GPU 111. The newly created surface and/or information sufficient to locate and use the surface can be returned to a requesting application 108 to enable the application to reuse the surface.

Step 212 enters the newly created surface into a corresponding one of the multiple surface lists. In particular, surface rendering interface 126 can use the particular constraints of the newly created surface, such as surface type, size, size constraints, and so forth, to determine an appropriate list that matches the particular constraints. The surface rendering interface 126 can then assign the surface to a corresponding list and/or add an entry for the new surface in the list. By adding the new surface to one of the multiple lists, the surface can be reused to service a subsequent request using the surface caching techniques described above and below.

Figure 3:
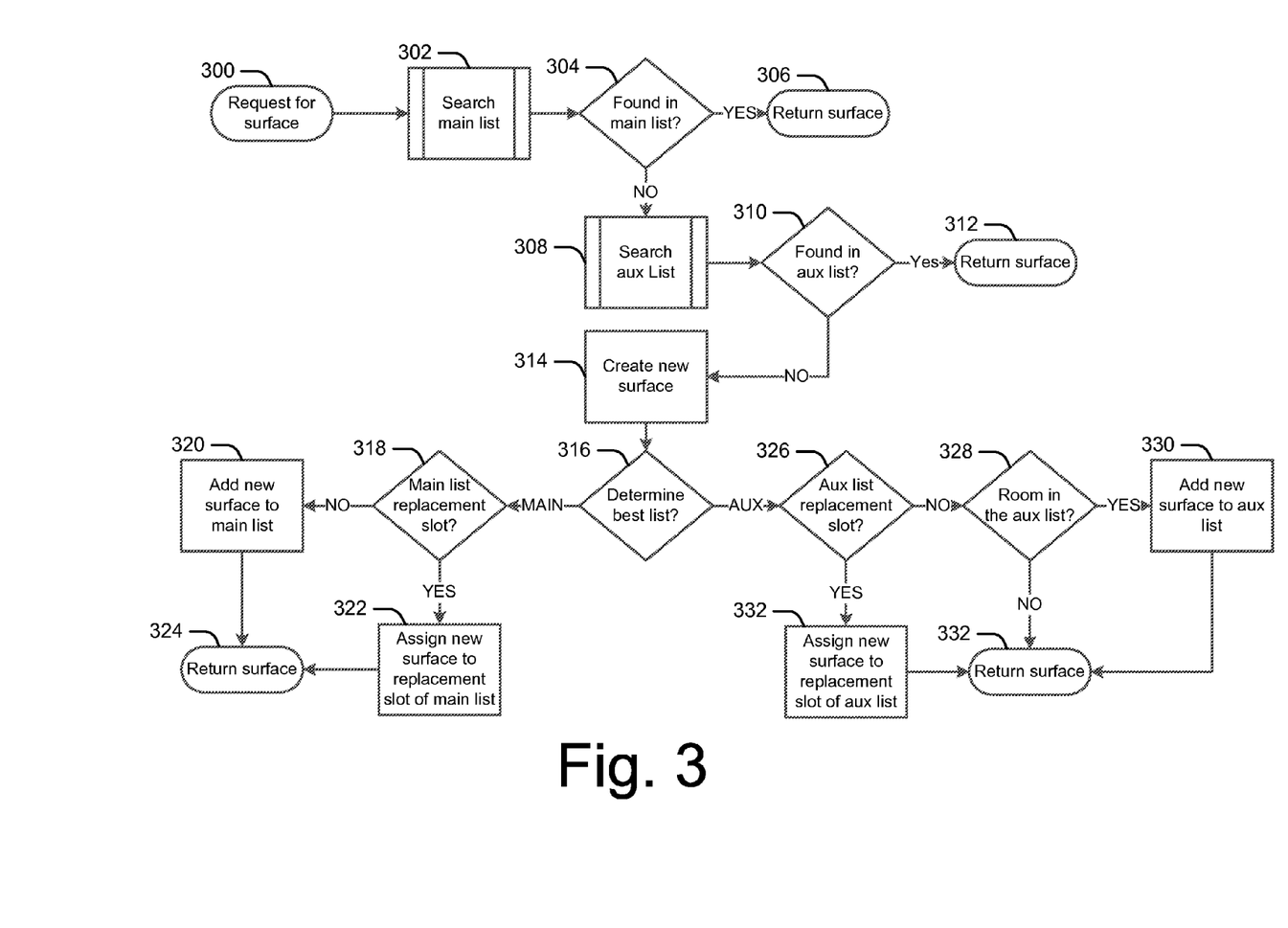
FIG. 3 is a flow diagram that describes steps of another example method in accordance with one or more embodiments.

FIG. 3 depicts another example method in which multiple surface lists are referenced to reuse surfaces to satisfy request for surfaces. In this example, the multiple lists include a main list and an auxiliary list. As mentioned, the lists can be used to group different surfaces in any suitable way using various constraints. Further, different lists can be configured as expandable lists or fixed size lists. An expandable list can be permitted to change in size dynamically to accommodate different sizes and/or numbers of surfaces. An expandable list can be unlimited in size (assuming sufficient memory is available for the list) or have a maximum size to which the list is permitted to expand. A fixed size list, as the name suggests, has a fixed size and/or a predetermined number of associated surfaces that can be assigned to the list.

Step 300 receives a request that initiates processing to discover or create a new surface to satisfy the request. This can trigger the surface rendering interface 126 to search multiple lists to determine if a matching surface is available. In one approach, searches of different lists can occur successively. In an alternate approach, multiple lists can be searched concurrently using comparable techniques. Then, a best matching surface could be selected from any candidate surfaces returned through the concurrent searches.

Figure 4:
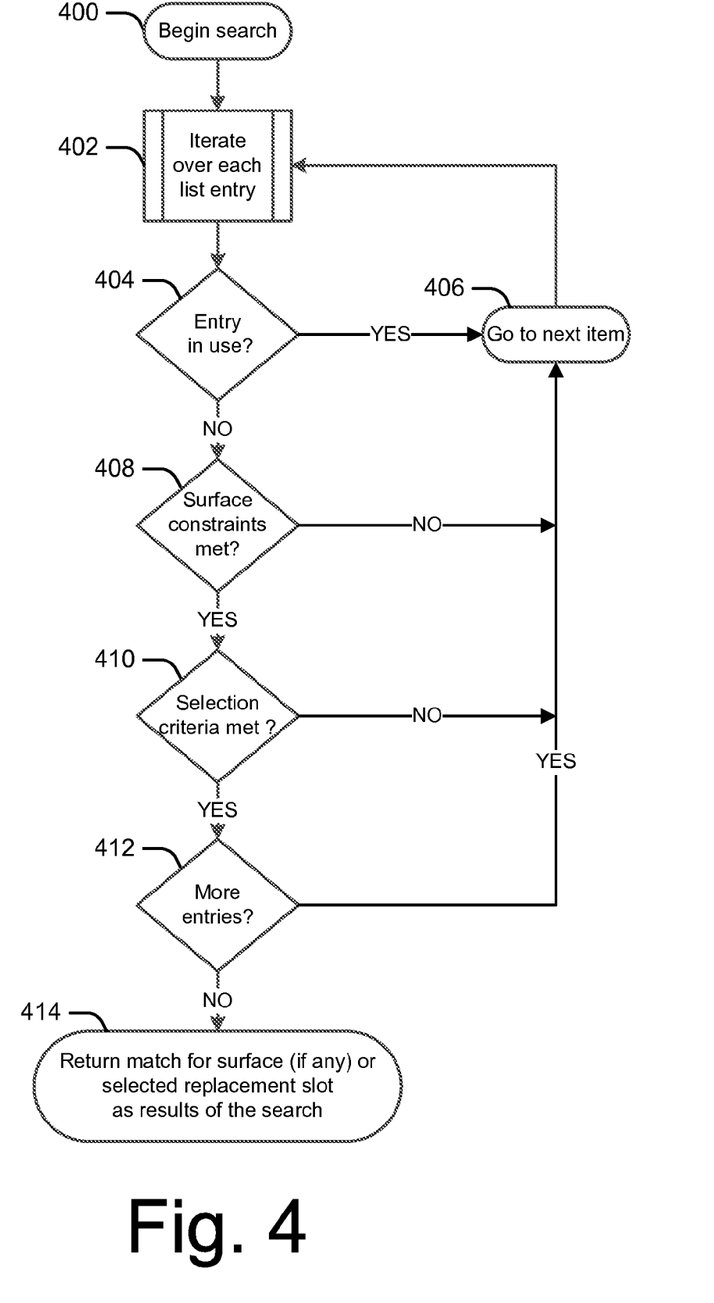
FIG. 4 is a flow diagram that describes steps of another example method in accordance with one or more embodiments.

FIG. 3, though, illustrates a successive approach. Accordingly, step 302 searches the main list and step 304 determines based on the search whether a suitable surface exists in the main list. One particular example of a suitable search algorithm that can be employed to search the main list is shown in FIG. 4 and described below. The search can return a matching surface if one exists as indicated at step 306. The search can also identify a location within the main list to add a new surface if a suitable surface does not exist. This can be an open spot within the list or an existing surface that is determined through the search to be the best candidate surface to replace within the list.

If a suitable surface does not exist in the main list, step 308 proceeds to search the auxiliary list and step 310 determines based on the search whether a suitable surface exists in the auxiliary list. The example search algorithm shown in FIG. 4 and described below can also be employed to perform the search of the auxiliary list. The search can again return a matching surface from the auxiliary list if one exists as indicated at step 312. The search can also identify a location within the auxiliary list to add a new surface if a suitable surface does not exist. If additional lists are employed (e.g., more than two list), searching of the additional lists can occur successively in a comparable manner.

Step 314 initiates operations to create a new surface if a suitable surface is not found through the list searching. For instance, the surface rendering interface 126 can direct the GPU 111 to create the new surface. The new surface that is created can be assigned to one of the multiple lists. An appropriate list can be selected based upon the particular properties of the surface that is created. Thus, step 316 determines the best list for the newly created surface. For example, the selection of a list to which the new surface is assigned can occur by comparing the properties of the new surface (type, size, or other constraints) to the constraints used for the multiple lists. The surface list that best matches the properties of the new surface can be chosen as the list to which the newly created surface will be assigned.

If the main list is chosen as the best list, step 318 determines whether a suitable replacement slot in the main list is available. This can be determined using information returned through the search conducted in step 304 regarding an identified replacement slot/surface. If a designated replacement slot for the main list is not returned by the search, step 320 adds the newly created surface to the main list. In this case, the new surface is added to a new position in the list. In this example, the main list is configured as an expandable list that can grow to accommodate new surfaces. If a suitable replacement slot is returned, step 322 assigns the new surface to the designated replacement slot of the main list. This can involve destroying an existing surface that is associated with the replacement slot to make room for the new surface. In either one of these cases, step 324 returns the appropriate surface as a response to the request made in step 300.

On the other hand, if the auxiliary list is chosen as the best list, step 326 determines whether a suitable replacement slot in the auxiliary list is available. For instance, the search conducted in step 308 may or may not return information regarding a replacement slot/surface that is identified through the search. If a designated replacement slot for the auxiliary list is not returned, step 328 determines whether there is room to add the surface in the auxiliary list. In this example, the auxiliary list represents a list that is configured as a fixed size list. Thus, the auxiliary list has a maximum size and/or number of surfaces that can be associated with the list. As long as sufficient room exists in the auxiliary list, step 330 adds the new surface to the auxiliary list. In this case, the new surface can be added to an empty position in the auxiliary list. Step 332 then returns the appropriate surface in response to the request made in step 300.

In some instances, there may not be sufficient room to add the new surface into the auxiliary list. If this is the case, the new surface may not be cached at all. Rather, the surface can be returned to the requester at step 332 and can simply be discarded after being used. Effectively, in this case, the new surface is created as an on-demand surface that is not configured for reuse.

If a suitable replacement slot in the auxiliary list is returned by the corresponding search, step 334 assigns the new surface to the designated replacement slot of the auxiliary list. Again, this can involve destroying an existing surface that is associated with the replacement slot to make room for the new surface. Step 332 then returns the appropriate surface in response to the request made in step 300.

It should be noted that an existing surface that is replaced in a list could be saved rather than destroying or discarding the surface. For instance, a surface that is replaced within the main list could be moved to the auxiliary list to upgrade a slot within the list. Likewise, surfaces could be moved in the other direction from the auxiliary list to the main list when appropriate. Surfaces to save by moving can be selected based upon constraints such as surface size, shape, and frequency of use. In this way, surfaces in one list that may match commonly occurring constraints in another list can be moved between the lists to create additional reuse opportunities.

A similar technique involves scavenging for an available unused surface from another list when creating a new surface. In this scenario, creating a new surface within a particular list can involve first checking to see if a suitable surface is available from another list. The scavenging can be based upon constraints such as surface size, shape, and frequency of use. For instance, when a surface is being created in the main list to service a request, a check of the auxiliary list can be made at the time of creation to determine whether a surface that matches constraints in the request is available. If a suitable unused surface is available, the main list can effectively "steal" the surface from the auxiliary list rather than creating a new surface.

Consider now a particular example of a suitable search algorithm depicted in FIG. 4 that can be used to discover and select matching surfaces within surface lists. In particular, FIG. 4 depicts an example method in which a search is conducted to discover a surface that is suitable to satisfy a request. Generally, the example search algorithm of FIG. 4 can be employed to perform searches of any suitable surface list, including searches of the main surface list 130 and the auxiliary surface list 132 in steps 302 and 310 of the example method of FIG. 3, respectively. The search can return a matching surface from one of the lists if a matching surface is discovered. If a matching surface is not discovered, the search can return an indication of a suitable slot within one of the lists to add a new surface.

Step 400 initiates the search. This can occur in response to a request to reuse a surface from a communication module 110 or other application 108 of a client 102. To perform the search for a particular list, step 402 iterates over each entry in the list. In the iteration loop for each entry, step 404 determines whether the surface for the entry is in use. Surfaces that are already in use are not available to be used for other requests and can be eliminated from consideration. Thus, if the surface is in use, step 406 proceeds to the next item in the list.

If the surface is not in use, however, step 408 determines whether surface constraints defined for the requested surface are met. A variety of different constraints for a surface can be designated by requestor including the surface size, oversize limit, type of surface, and so forth. In effect, the suitability of a surface is tested against the surface constraints designated in the request. If the designated constraints placed on a surface are not met, the surface can be eliminated as a candidate and the procedure again proceeds to the next item in step 406.

If the surface does meet the designated surface constraints, step 410 determines whether selection criteria used to select between multiple matching surfaces are met. In contrast to the surface constraints of the preceding step that represent actual properties of the surface designated in the request, the selection criteria are used to control selection of a "best" surface from among multiple surfaces that may satisfy the surface constraints. If the designated selection criteria are not satisfied, the procedure proceeds to the next item in step 406. If the selection criteria are satisfied, though, the entry/surface is selected as the best matching candidate at this point in the process. Note that the entry/surface selected in step 410 can be replaced by a better matching candidate in a subsequent iteration.

In one approach, the selection criteria are configured to cause the smallest matching surface to be selected as the best candidate to fulfill the request. This can reduce memory usage by reusing smaller surfaces and thereby enabling some larger surfaces to be discarded. In this example, if a matching surface is selected as the best candidate it is the surface that is the smallest matching surface encountered so far in the process. Otherwise, the surface can be eliminated as a candidate even though it matches the surface constraints. The surface is eliminated because a better (e.g., smaller sized) matching surface has already been identified. Other example selection criteria can include but are not limited to the newest surface, the least used surface, and so forth.

Step 412 determines whether there are more entries to process in the particular list being searched. If so, the procedure again proceeds to the next item in step 406 and the processing repeats for the next entry. When there are no more entries, step 414 outputs results of the search. This can include returning the best matching surface if one was discovered through the search. In addition or alternatively, the search can also identify a suitable replacement candidate in the list if there is not a matching surface. The replacement candidate can be an empty slot within the list (e.g., unfilled space in the surface cache). The replacement candidate can also be selected as an existing surface that is considered to be ripe for removal. Various criteria can be employed to determine and select an existing surface that is the "best" candidate to be replaced in the list. By way of example, an existing surface to replace can be selected as the oldest existing surface, the least used surface, the largest surface by area, or the surface having the largest single dimension. Other suitable criteria such as the aspect ratio and/or shape of a surface can also be used to select a surface to be removed from the list. The results of the search can then be used to respond to a surface request in accordance with the example procedure of FIG. 3 discussed previously.

Having considered example techniques for surface caching, consider a discussion of an example system in accordance with one or more embodiments.

Example System

Figure 5:
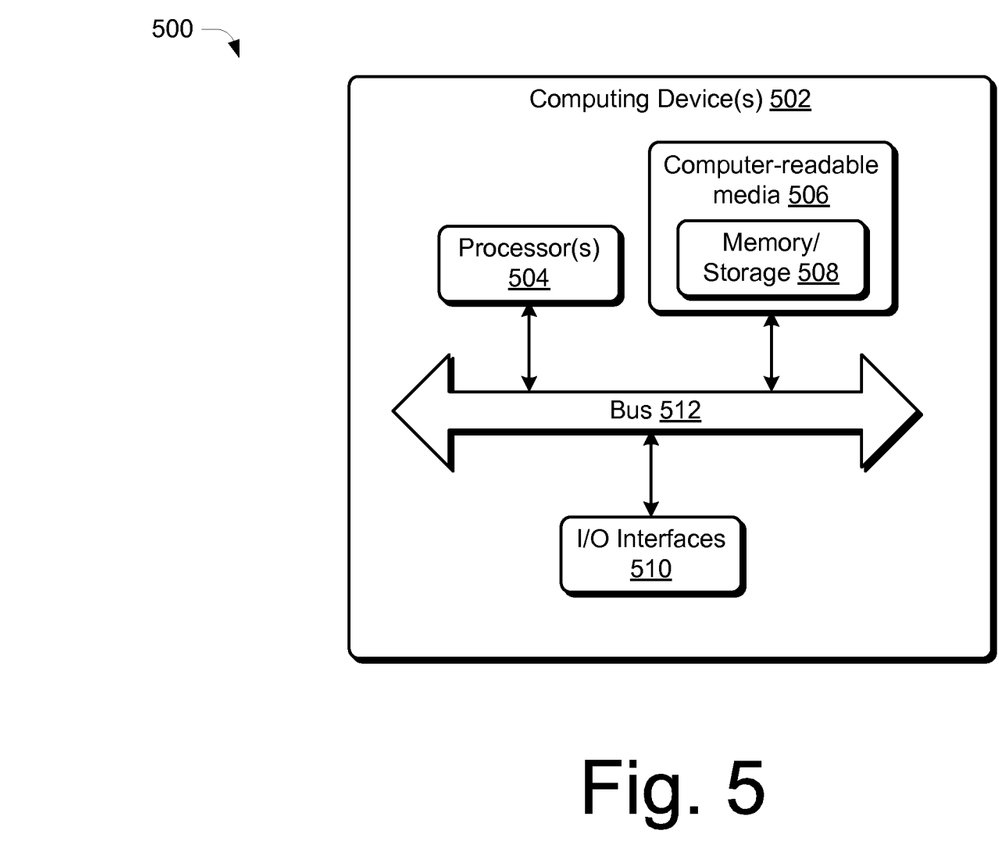
FIG. 5 illustrates an example computing system that can be used to implement one or more embodiments.

FIG. 5 illustrates an example system generally at 500 that includes an example computing device 502 that is representative of one or more such computing systems and/or devices that may implement the various embodiments described above. The computing device 502 may be, for example, a server of a service provider, a device associated with the client 102 (e.g., a client device), an on-chip system, and/or any other suitable computing device or computing system.

The example computing device 502 includes one or more processors 504 or processing units, one or more computer-readable media 506 which may include one or more memory and/or storage components 508, one or more input/output (I/O) interfaces 510 for input/output (I/O) devices, and a bus 512 that allows the various components and devices to communicate one to another. Computer-readable media 506 and/or one or more I/O devices may be included as part of, or alternatively may be coupled to, the computing device 502. The bus 512 represents one or more of several types of bus structures, including a memory bus or memory controller, a peripheral bus, an accelerated graphics port, and a processor or local bus using any of a variety of bus architectures. The bus 512 may include wired and/or wireless buses.

The one or more processors 504 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via the network 112. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the surface rendering interface 126, communication module 110, applications 108, resource manager module 120, and other program modules, may be implemented as one or more instructions and/or logic embodied on some form of computer-readable media.

Accordingly, particular modules, functionality, components, and techniques described herein may be implemented in software, hardware, firmware and/or combinations thereof.

The computing device 502 may be configured to implement particular instructions and/or functions corresponding to the software and/or hardware modules implemented on computer-readable media. The instructions and/or functions may be executable/operable by one or more articles of manufacture (for example, one or more computing devices 502 and/or processors 504) to implement techniques for surface caching, as well as other techniques. Such techniques include, but are not limited to, the example procedures described herein. Thus, computer-readable media may be configured to store or otherwise provide instructions that, when executed by one or more devices described herein, cause various techniques for surface caching.

CONCLUSION

Techniques have been described in which a cache for surfaces can enable existing surfaces to be reused. Surfaces in the cache can be assigned to one of multiple surface lists used to service requests for surfaces. The multiple lists can include at least a main list and an auxiliary list configured to group existing surfaces according to corresponding properties. When a surface is requested, the multiple lists can be searched to find an existing surface based on constraints including, for example, the type of surface and size requirements for the requested surface. If an existing surface satisfying the constraints is discovered, the existing surface can be returned to service the request. If a suitable surface is not found in any of the multiple lists, a new surface is created for the request and the new surface can be added to a corresponding one of the multiple surface lists.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    creating a cache of reusable surfaces assigned to multiple surface lists used to select surfaces to satisfy requests for surfaces, the reusable surfaces comprising intermediate rendering surfaces for rendering web pages;
    obtaining a request to reuse a surface from the cache;
    examining the multiple surface lists to discover an existing surface in the cache to satisfy the request, the multiple surface lists including a main surface for rendering of tree-based content and an auxiliary surface list for rendering of non tree-based content;
    when an existing surface is discovered, using the existing surface to satisfy the request; and
    when an existing surface is not available, creating a new surface to satisfy the request, wherein the surfaces in the cache are intermediate rendering surfaces configured to enable rendering of content within web pages.

2. The computer-implemented method of claim 1, further comprising when created, entering the new surface into a corresponding one of the multiple surface lists to enable reuse of the new surface.

3. The computer-implemented method of claim 1, wherein the multiple surface lists are configured to group the surfaces in the cache based upon corresponding surface constraints associated with the surfaces that define properties of the surfaces.

4. The computer-implemented method of claim 3, wherein the surface constraints used to group the surfaces in the multiple surface lists include one or more of type of surface, size of surface, or type of content compatible with the surfaces.

5. The computer-implemented method of claim 1, wherein:
the request is configured to designate one or more surface constraints for the requested surface; and
the examining includes checking surfaces within the multiple lists against the designated surface constraints to identify one or more surfaces that match the designated surface constraints.

6. The computer-implemented method of claim 1, wherein the examining includes searching the multiple lists successively to discover a surface that matches surface constraints designated by the request.

7. The computer-implemented method of claim 1, wherein the examining includes selecting an existing surface from one of the multiple lists to satisfy the request as a smallest available surface that matches surface constraints designated by the request.

8. The computer-implemented method of claim 1, wherein:
the web pages include complex web pages of composited content to provide visual effects;
at least one of said multiple surface lists is configured as an expandable surface list;
the multiple surface lists are configured to group the surfaces in the cache based upon corresponding surface constraints associated with the surfaces that define properties of the surfaces including at least the size of the surfaces; and
the request designates constraints for the requested surface including at least of a requested size for the requested surface.

9. A computer-implemented method comprising:
obtaining a request to reuse a surface in a cache of intermediate rendering surfaces used to render web pages, the request designating one or more surface constraints for a requested surface;
in response to the request, searching multiple surface lists that are configured to group surfaces included in the cache based upon corresponding surface constraints associated with the surfaces;
the multiple surface lists including at least a main surface list of surfaces corresponding to nested content having a plurality of interrelated nodes and an auxiliary surface list of surfaces corresponding to other types of content;
the searching including checking surfaces in the multiple surface lists to determine whether the surfaces match the surface constraints designated in the request and eliminating, from consideration, surfaces that are determined to be in use; and
returning, as a result of the searching, an existing surface from one of the multiple surface lists that matches surface constraints designated in the request, or a location within one of the multiple surface lists to add an entry for a newly created surface when a surface that matches the surface constraints is not discovered through the searching.

10. The computer-implemented method of claim 9, wherein the searching comprises determining whether one or more surfaces identified as matching the surface constraints designated in the request satisfy selection criteria used to select between multiple matching surfaces.

11. The computer-implemented method of claim 9, wherein the surface constraints are configured to group surfaces in the multiple surface lists based at least in part upon the size of the surfaces.

12. One or more computer-readable storage media storing instructions that, when executed via a computing device, implement a surface rendering interface configured to:
group intermediate rendering surfaces for rendering content of web pages included in a cache of surfaces into multiple surface lists including at least a main surface list associated with composited content rendered as successive layers and an auxiliary surface list associated with other types of content, the surfaces being used for content rendering according to different types of content compatible with the surfaces;
in response to obtaining a request to reuse a surface from the cache:
search the main surface list to determine whether a matching surface that matches surface constraints designated in request is available in the main surface list;
when the matching surface is available in the main surface list, return the matching surface as a response to the request;
when the matching surface is not available in the main surface list, search the auxiliary surface list to determine whether a matching surface is available in the auxiliary surface list.

13. One or more computer-readable storage media of claim 12, wherein the main surface list is configured to include surfaces that are created for rendering of tree-based content.

14. One or more computer-readable storage media of claim 12, wherein the surface rendering interface is further configured to create a new surface to fulfill the request when the matching surface is not available in the main surface list and not available in the auxiliary surface list.

15. One or more computer-readable storage media of claim 14, wherein the surface rendering interface is further configured to add an entry for the new surface that is created in the main surface list or the auxiliary surface list to enable the new surface to be reused.

16. One or more computer-readable storage media of claim 12, wherein the surface rendering interface is implemented as a component of a browser application of the computing device.

17. One or more computer-readable storage media of claim 12, wherein the main surface list is configured as an expandable list and the auxiliary surface list is configured as a fixed size list.

* * * * *